United States Patent [19]
Kuperstein

[11] Patent Number: 5,048,100
[45] Date of Patent: Sep. 10, 1991

[54] SELF ORGANIZING NEURAL NETWORK METHOD AND SYSTEM FOR GENERAL CLASSIFICATION OF PATTERNS

[76] Inventor: Michael Kuperstein, 40 Longwood Ave., Brookline, Mass. 02146

[21] Appl. No.: 284,975

[22] Filed: Dec. 15, 1988

[51] Int. Cl.$^5$ .............................................. G06K 9/66
[52] U.S. Cl. ...................................... 382/36; 382/15; 364/715.11; 364/807
[58] Field of Search ...................... 382/14, 15, 33, 35, 382/36, 37, 42; 364/715.11, 807

[56] References Cited

U.S. PATENT DOCUMENTS

| | | | |
|---|---|---|---|
| 4,326,259 | 4/1982 | Cooper et al. | 382/36 |
| 4,760,604 | 7/1988 | Cooper et al. | 382/15 |
| 4,774,677 | 9/1988 | Buckley | 382/15 |
| 4,805,225 | 2/1989 | Clark | 382/15 |
| 4,926,491 | 5/1990 | Maeda et al. | 382/36 |

*Primary Examiner*—David K. Moore
*Assistant Examiner*—Yon Jung
*Attorney, Agent, or Firm*—Sprung Horn Kramer & Woods

[57] ABSTRACT

A neural network system and method that can adaptively recognize each of many pattern configurations from a set. The system learns and maintains accurate associations between signal pattern configurations and pattern classes with training from a teaching mechanism. The classifying system consists of a distributed input processor and an adaptive association processor. The input processor decomposes an input pattern into modules of localized contextual elements. These elements in turn are mapped onto pattern classes using a self-organizing associative neural scheme. The associative mapping determines which pattern class best represents the input pattern. The computation is done through gating elements that correspond to the contextual elements. Learning is achieved by modifying the gating elements from a true/false response to the computed probabilities for all classes in the set. The system is a parallel and fault tolerant process. It can easily be extended to accommodate an arbitrary number of patterns at an arbitrary degree of precision. The classifier can be applied to automated recognition and inspection of many different types of signals and patterns.

24 Claims, 2 Drawing Sheets

SELF ORGANIZING NEURAL NETWORK METHOD AND SYSTEM FOR GENERAL CLASSIFICATION OF PATTERNS

BACKGROUND OF THE INVENTION

The present invention relates to a pattern recognition method and system and in particular to the use of neural networks for use therewith.

The most popular current approach to pattern recognition has been to analyze an object or pattern into features and attempt to match those features against programmed feature-templates. The major difficulty with this approach for generalized object recognition is that no set of known universal features exist for all objects. Thus for each pattern family, someone has to determine the most efficient features and program them into a classifier.

The growing field of neural networks aims to build intelligent machines using computational methods inspired by the mechanisms of brain function. The field is attempting to solve problems that are either too difficult or impractical for present computer approaches. These problems can be described most generally as computation of pattern recognition and pattern production. Pattern recognition includes the recognition of objects that are seen, heard, or felt; for example, faces, speech and handwriting. Pattern production includes the coordination of many coupled joints and muscles; and the formation of maps of related goals; for example grasping, walking and speaking.

Neural networks deal with information very differently than conventional computers. It is not just that they have a parallel architecture. The most basic differences come from how information is represented, processed and stored.

The computer's basic building blocks are binary numbers. Computers work at their best when inputs are translated into this binary language so that information can be manipulated by binary logic and without any inherent interference from neighboring information. By contrast, information in neural networks is input and processed as patterns of signals that are distributed over discrete processing elements. Neighboring information interact strongly in setting contexts to the patterns of signals. Unlike Artificial Intelligence, there are no symbols to manipulate. Symbolic manipulation has difficulty with problems that require vaguely described patterns like the variations in handwritten characters. Neural networks are designed to work best with pattern information in some context such as that found in the geometric distributions of strokes in character patterns.

Although the architectures of computers and neural networks are very different, recent fast computer processors and graphic displays have made it possible to simulate neural networks.

The architectures of neural networks have a linear or planar arrangement of simple identical computational elements, called neurons, where each neuron can modify the relationship between its inputs and its output by some rule. The power of a given neural network comes from a combination of the geometry used for the connections, the operations used for the interaction between neurons and the learning rules used to modify the connection strengths.

Applicant has successfully applied neural network theory to adaptive sensory-motor control and has implemented it. The networks perceive space subjectively in a robot controller, by the relationship between a how a robot sees and where it moves in space. The neural networks learn from their own experience. They make their own mistakes and organize their own coordination, much like babies do.

The flexibility of a general pattern classifier will not only be of interest to optical character recognition but can also be transferred to speech recognition, object recognition and general signal processing where the signal information is often interrelated, incomplete and even partially contradictory. Commercial applications of neural pattern classifiers will open up new markets in automation of image analysis, product inspection, reconnaissance and interfacing between man and computer. It will eliminate the labor-intensive programming of template features for different families of patterns. This should result in not only higher performance object recognition but also in pattern classifiers that are more cost effective and thus more economically attractive and competitive.

There are a number of other research efforts and patents in neural pattern classification: They are based on concepts that include back-propagation (Rumelhart, Hinton and Williams, 1986), adaptive resonance theory (Carpenter and Grossberg, 1987), Hopfield nets (Hopfield and Tank, 1986) U.S. Pat. No. 4,660,166 and U.S. Pat. No. 4,719,591 and Nestor modules (Cooper and Elbaum, 1981) U.S. Pat. No. 4,326,259.

SUMMARY OF THE INVENTION

The main object of the present invention is the use of neural networks having distributed contextual elements to eliminate the difficulties of the prior art. The pattern classifier according to the invention addresses the problem of recognizing handwritten characters which is writer-independent and font independent. The solution involves the classification of varying character-patterns into alphabetic and numeric classes. This classification is achieved in the face of character patterns that vary in size, slant, stroke thickness, asymmetry, number of strokes and disconnected strokes within a background of varying amounts of visual noise.

The present invention is embodied in a neural network system and method that can adaptively recognize each of many pattern configurations from a set. The system learns and maintains accurate associations between signal pattern configurations and pattern classes with training from a teaching mechanism. The classifying system consists of a distributed input processor and an adaptive association processor. The input processor decomposes an input pattern into modules of localized contextual elements. These elements in turn are mapped onto pattern classes using a self-organizing associative neural scheme. The associative mapping determines which pattern class best represents the input pattern. The computation is done through gating elements that correspond to the contextual elements. Learning is achieved by modifying the gating elements from a true/false response to the computed probabilities for all classes in the set. The system is a parallel and fault tolerant process. It can easily be extended to accommodate an arbitrary number of patterns at an arbitrary number of patterns at an arbitrary degree of precision. The classifier can be applied to automated recognition and inspection of many different types of signals and patterns.

The most important differences between the present invention and the other approaches can be summed up by the combination of three new concepts:

1. Topographically organized neural layers;
2. Representations of pattern-contrast orientation and
3. Multilevel spatial scales.

These new concepts in the neural classifier design will significantly increase the recognition ability over other network approaches. The topographically organized neural layers allow an arbitrary degree of recognition resolution. The representations of pattern-contrast orientation are independent of the class of patterns to be recognized. Finally the multilevel spatial scales allow image contrast in different size contexts to affect classification.

There are also other key differences in the adaptive associative network of the present invention versus U.S. Pat. No. 4,326,259 (Nestor). In particular, the present invention does not use threshold logic in the associative algorithm which Nestor uses. Instead, the present invention uses output error (discussed below).

The design of the neural classifier of the present invention has three key aspects:

1. The geometry of the neural architecture.
2. The transformations between neural layers.
3. The learning rule for changing the connection strengths (neural weights).

The design of a neural classifier allows an arbitrary number of neural layers to be added to the system in order to extend the discrimination capacity of the system. Like the brain, if the correct neural transformations are matched with the correct neural geometry, higher order layers should represent increasingly more abstract knowledge of the image patterns. In the disclosed embodiment, there are three neural layers. It will be recognized that more than 3 layers can also be used. Each layer is composed of pattern-contrast representations in a topography. Topography is an ordered spatial representation in which neighboring inputs or outputs correspond to neighboring elements of the representation with possible overlap.

Each successive neural layer has increasingly larger spatial-scale representations of the image. In this way, the classifier can discriminate both small detail variations in a pattern as well as overall configurational changes in a pattern.

In general, the capacity for pattern discrimination of a neural classifier increases as the number of different spatial measures of the input image are computed and then associated with the appropriate classes. The spatial measures should be simple to compute and general enough to allow the largest number of discriminations. Here, we borrow transformations that have been experimentally uncovered in the brain's visual cortex. It has been shown that the brain processes the orientation of visual contrast. This type of processing can be easily mimicked by convolving an image with various kernels as shown by applicant in Generalized Neural Model For Adaptive Sensory-Motor Control of Single Postures Proc. IEEE Internat. Conf. Automat. Robotics, April (1987), Philadelphia, Pa. 140–144. If these transformations are repeated in higher order neural layers, then increasingly larger spatial-scale representations of the image will be computed.

These and other objects and features of the present invention are achieved in accordance with the present invention by a system and method of classifying a pattern into one of a plurality of pattern classes.

The method comprises for each of a plurality of pattern classes, defining at least one spatial distribution of image contrast relative to a spatial window on an image of a pattern in the pattern class, and converting a pattern to be classified into an image. The image is preferably two dimensional and binary for optical character recognition. The method also includes measuring at least one spatial distribution of image contrast of the image relative to the spatial window on the image, transforming the measured at least one distribution of image contrast into computed pattern classes using a distribution of weights and determining one pattern class from the computed pattern classes to classify the pattern.

The step of measuring preferably comprises convolving the image with at least one different convolution kernel. The step of measuring further comprises averaging the convolutions of the image across spatial sectors within the spatial window and normalizing the averaged convolutions of the image.

When convolving the image with a plurality of different convolution kernels, the of defining comprises, for each pattern class, storing a map of initial neural weights for each convolution corresponding to the spatial distribution for that kernel for the pattern class, initially measuring the spatial distribution of image contrast for each convolution of the image of a pattern known to be classified in the pattern class, transforming the initially measured spatial distributions with the initial neural weight maps to produce computed pattern classes, and determining errors and updating the stored weight maps by comparing the computed pattern class spatial distributions with expected pattern class partial distributions. The step of determining comprises selecting the pattern class with the highest probability from the computed pattern classes.

In character recognition, the step of converting a pattern to be classified into an image comprises converting a page into a binary image, processing the image to determine the number of lines of characters and isolating each character on each line for measurement of the at least one spatial distribution thereof. The spatial window is disposed at the horizontal center of the character to be classified and at a vertical center of the average height of the characters in the line thereof and the window enclosed the character.

The system according to the invention for classifying a pattern into one of a plurality of pattern classes, comprises means for each of a plurality of pattern classes for defining at least one spatial distribution of image contrast relative to a spatial window on an image of a pattern in the pattern class, means for converting a pattern to be classified into an image, means for measuring the at least one spatial distribution of image contrast of the image relative to the spatial window on the image, means for transforming the measured at least one distribution of image contrast into computed pattern classes using, a distribution of weights and means for determining one pattern class from the computed pattern classes to classify the pattern.

The present invention will now be explained in more detail in the following with references to the drawings wherein:

DETAILED DESCRIPTION OF THE INVENTION

Figure 1:
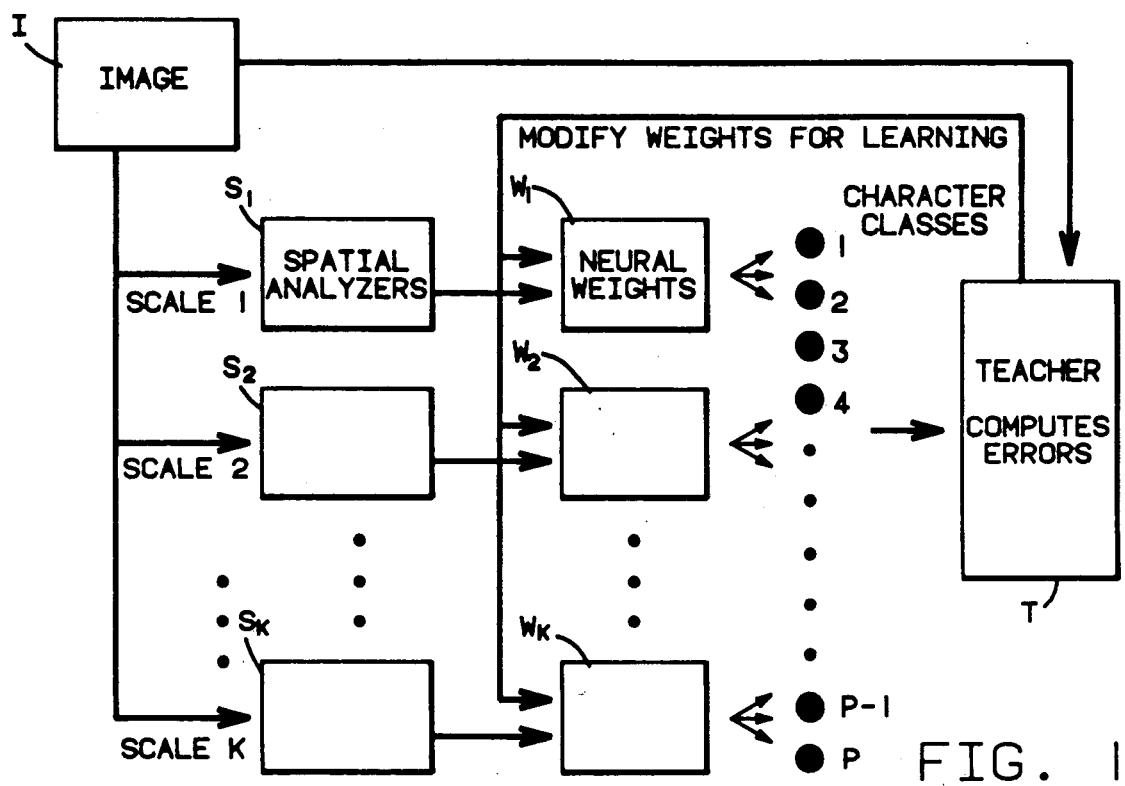
FIG. 1 is a block diagram of the architecture for a neural classifier according to the invention.

FIG. 1 shows a schematic block diagram of the architecture for the neural classifier. The binary image I of a character pattern is first transformed by spatial analyzers $S_1$-$S_k$ which convolve the raw image I into another image. In the preferred embodiment shown, this is a binary two-dimensional image. It is however understood that a three dimensional image could be obtained and that the representation thereof could be in a different number system. The resulting image has element values that vary with different orientations of visual contrast and different orientations of pattern configuration, in the raw image. Pattern configuration is defined as a relative measure of the spatial distribution of image contrast relative to a spatial window. For example, such a measure would tell how much of an image contrast was located in the upper half of a window relative to how much of an image contrast was located in the lower half of the window.

In the case of a handwritten character, the spatial window circumscribes the character. The center of the window is preferably located at the horizontal center of the pattern and at a vertical center of the average height of the neighboring characters. Others contextual constraints on the shape and location of a window can be used to discriminate similar characters. A constraint on window location is necessary to distinguish a handwritten "q" from a handwritten "9" within a line of characters. In this example, the "q" is written lower than the "9" and thus the distribution of image contrast relative to a spatial window would be different.

Figure 1A:
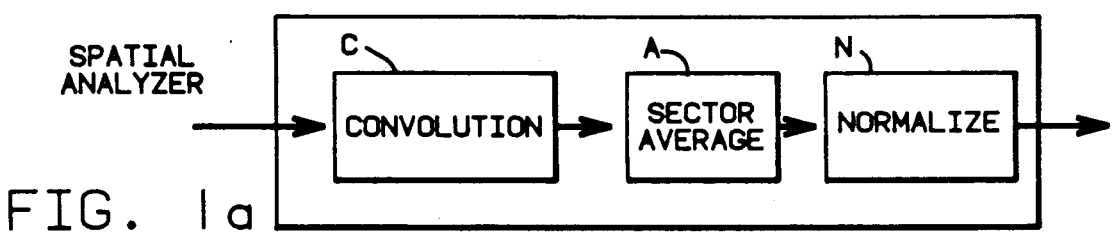
FIG. 1a is a detail of the spatial analyzer of FIG. 1.
Figure 2:
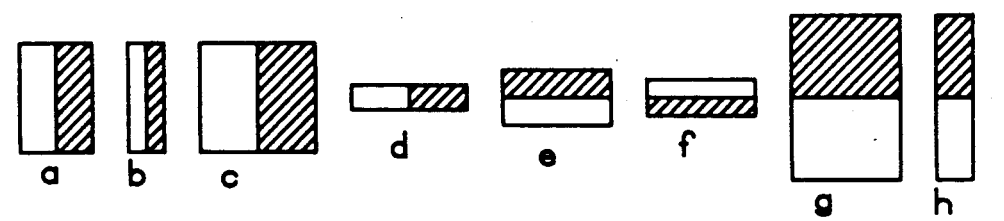
FIG. 2 show different convolution kernels a-o.
Figure 2:
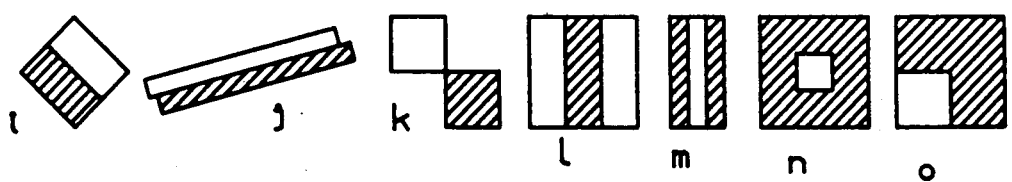

Examples of common convolution kernels used for the spatial analysis of patterns are shown in FIG. 2. The kernels are composed of a one or more dimensional arrays of coefficients. Clear areas in the two dimensional kernels shown in FIG. 2, contain positive coefficients and grey areas contain negative coefficients. In many cases, the sum of the kernel coefficients=0, so that when a raw image with uniform contrast is convolved with them, the resulting image contains 0 coefficients. The effects of convolving the kernels with an image can be divided into a number of categories that depend on the aspect ratio between the height and width of the kernels, the spatial arrangements of subareas in the kernels and ratio of kernel size to pattern size in an image. Table 1 categorizes these different effects. The images resulting from these spatial analyzers are computed by the convolution:

$$S_{ij<k>} = I_{ij} * K_k \qquad (1)$$

where ij are the image element indices (i=1,2 ... I; j=1,2 ... J), $I_{ij}$ is the raw input image, k is the spatial kernel index (k=1,2 ... K), $K_k$ is the spatial analyzing kernel and $S_{ij<k>}$ is the resulting image transformations. These images are then normalized in normalizers $N_i$-$N_k$ (FIG. 1a) to generate relative measures of configuration contrast within each scale. This makes the spatial analysis insensitive to the absolute amount of contrast in the image. The elements of these transformations make up the set of generalized pattern feature elements which are mapped onto pattern classes using a self-organizing associative neural scheme detailed in equations 2--4.

TABLE 1

EFFECTS OF KERNEL TYPE RELATIVE TO PATTERN SIZE

| | KERNEL TYPE: bilateral and trilateral | | | |
|---|---|---|---|---|
| PATTERN: | width > height | width kernel ≈ height | width < height | symmetric |
| <<kernel size | uniform field ≈ 0 | uniform field ≈ 0 | uniform field ≈ 0 | uniform field ≈ 0 |
| <kernel size | oriented config. | bilateral config. | oriented line | small blob |
| ≈kernel size | oriented config. | bilateral config. | oriented border | blob |
| >kernel size | oriented config. subareas | bilateral config. subareas | oriented edges | unoriented edges |
| >>kernel size | high spatial contrast | high spatial contrast | high spatial contrast | high spatial contrast |

Each spatial representation generated by the spatial analyzers $S_1$-$S_k$ is multiplied by neural weights for all character classes to determine the probability for each pattern class. This is represented by the equation:

$$C_p = \Sigma_{ij<k>}(S_{ij<k>} W_{ij<k><p>}) \qquad (2)$$

where ij are the image element indices, p is the pattern class index (p=1,2 ... P), $S_{ij<k>}$ is the spatial map representation, $W_{ij<k><p>}$ are the neural weights which associate the spatial maps with the pattern classes and $C_p$ are the computed pattern classes (in this case, the alphabet and numerals). The character class that has the highest value $C_p^*$ is the one that the neural classifier computes to have the largest probability of being the correct class (letter or number) for the image pattern.

$$C_p^* = \max(C_a, C_2 \ldots C_p) \qquad (3)$$

Figure 3:
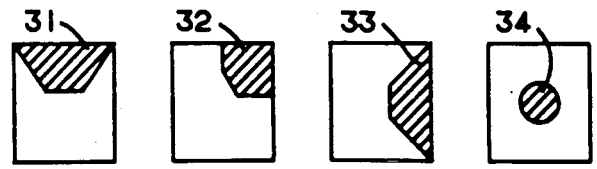
FIG. 3 shows examples of sector template patterns.

An improvement to the above procedures for both memory efficiency and insensitivity to small pattern shifts, is achieved by adding another processing stage $A_1$-$A_k$ (FIG. 1a) in the spatial analysis. This stage averages the convolution results across spatial sectors within a pattern window:

$$S'_{<q><k>} = \Sigma_{ij}(S_{ij<k>} A_{ij<q>}) \qquad (4)$$

where $S'_{<q><k>}$ are averaged sector results and $A_{ij<q>}$ are the sector-template patterns used in the averaging. FIG. 3 shows examples of sector templates which overlap in the window. The resulting section averages are then normalized to the maximum value:

$$S''_{<q><k>} = S'_{<q><k>}/\max_{<q><k>}) \qquad (5)$$

This normalization allows the pattern classification to be insensitive to variations of stroke width and boldness which causes variations in the spatial convolutions even for the same pattern configurations. The normalized results are then multiplied by weights $W_1$-$W_k$ for each pattern class to determine the probability for each class (similar to equation 2):

$$C_p = \Sigma_{q<k>}(S''_{q<k>} W_{q<k><p>}) \qquad (6)$$

Note that equation 5 requires only a small fraction of the number of weights as equation 2. Just as before, the class with the maximum probability is chosen to represent the original pattern (equation 3). The biggest improvement in equations 4-6 is the insensitivity to unforeseen shifts of novel patterns, thus resulting in more accurate recognition.

The neural weights represent the global association between all the character patterns and all the pattern classes. Because the spatial transformations overlap in all the neural layers, the system provides interpolation for novel character patterns during the recognition period.

The weights are changed during a training period by an automated teacher T comprising a computer (FIG. 1). The teacher module knows the correct pattern class for the training pattern. It computes the errors for all pattern classes and then uses those errors to update the neural weights. The pattern class errors are determined by the difference between the expected, $E_p$ and the computed, $C_p$ pattern classes. Thus the errors:

$$e_p = E_p - C_p \begin{cases} E_p = 1 \text{ for } p = \text{ expected class} \\ E_p = 0 \text{ for } p \neq \text{ expected class} \end{cases} \quad (7)$$

The errors are used to update the neural weights by the equation:

$$W_{(n+1)ij<k><p>} = W_{(n)ij<k><p>} + d\, S_{ij<k>} e_p \quad (8)$$

where n is the trial number, $e_p$ are the pattern class errors and d is the learning rate.

The following equation is used to update the weights for the improved spatial analysis scheme:

$$W_{(n+1)q<k><p>} = W_{(n)q<k><p>} + dS''_{q<k>} e_p \quad (9)$$

As the classifier learns, the $C_p$ corresponding to the correct pattern approaches the value 1 while the $C_p$ not corresponding to the correct pattern approaches the value 0. Thus, the values across the set of $C_p$ can be interpreted as the probability distribution of which pattern class is best matched with an input pattern. The pattern class with the highest probability is the one best corresponding to the input pattern.

Figure 4:
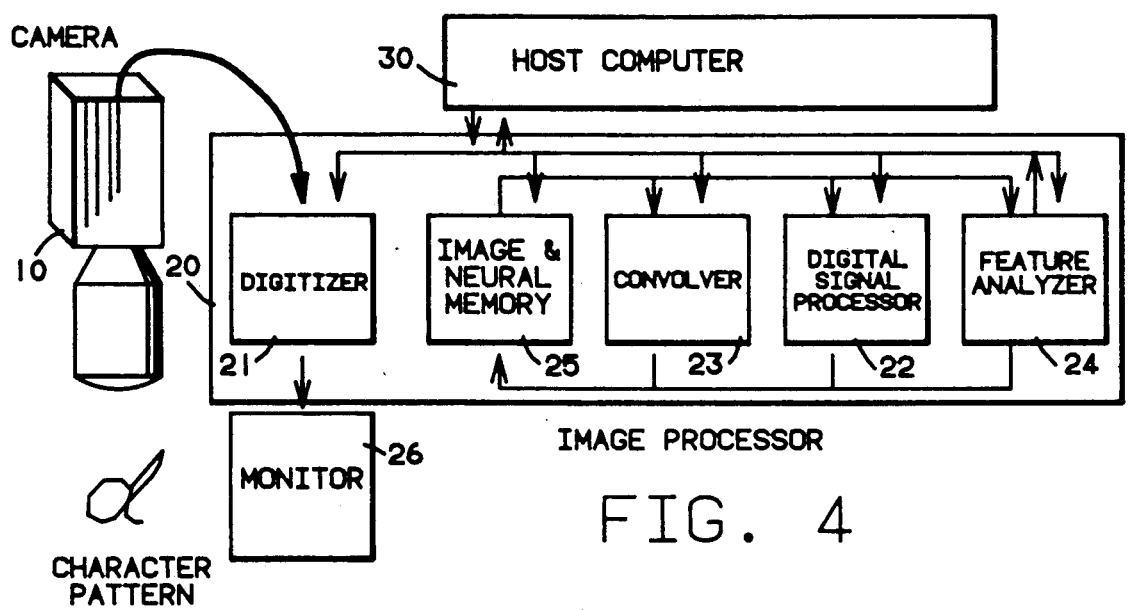
FIG. 4 is a block diagram of the system for implementing the method and system of the invention, and according to the present invention

A preferred embodiment of the neural classifier has been implemented on an image processing system as shown in FIG. 4. A single camera 10 with auto-intensity-compensation converts pattern 1 to a binary image and is connected to an image processing system 20. The image processing system has a high throughput speed which stores the image and weights in memory 25 and allows real time image digitizing in digitizer 21, digital signal processing in processor 22, convolving in convolver 23 and feature extracting in analyzer 24. Software code development and image processor control is done via a host computer 30 and results of digitizing can be seen on monitor 26

The neural input map transformations are processed in 8 bit resolution while the neural weights were processed in 16 bit resolution. This allows a learning rate as small as 0.0001 which is essential in providing precise control over discrimination of similar looking character patterns. The values for the constants and parameters in equations 1-9 for the preferred embodiment are listed in Table 2.

TABLE 2

| CONSTANT VALUES AND PARAMETERS | | | | |
|---|---|---|---|---|
| I = 32 | J = 48 | K = 32 | P = 20 | d = .05 | kernel description: bilateral type at 1/7, 2/7, 3/7 and 4/7 size of pattern.

The flow chart for the sequence of operations in the preferred embodiment for recognizing hand written print is shown in Table 3.

TABLE 3

FLOW CHART FOR CHARACTER RECOGNITION

LEARNING
I. Preprocess image
   A. Input raw image
   B. Clean the image by high spatial contrast of raw image followed by thresholding and normalizing into a binary valued image.
II. Isolate Character
   A. Smear clean image horizontally and vertically, respectively,
   B. Multiply horizontal smear image by vertical smear image and threshold result into blobs.
   C. Determine rectangular windows that circumscribe blobs.
   D. Normalize character size by mapping window of clean image to standard size window.
III. Spatial analysis of character
   A. Convolve binary image with different size kernels (equation 1) and normalize results in each scale (equation 4)
   B. Normalize convolution result (equation 5).
IV. Adaptive Association
   A. Multiply the result of IIIB with weight maps for each class and sum for each class to yield a probability for each class (equation 2 or equation 6).
   B. The class with the highest probability is chosen (equation 3).
   C. Teacher mechanism determines the classification errors (equation 7).
   D. Update the weight maps dependent on the classification errors (equation 8 or 9).
PERFORMANCE
Same as for LEARNING not including steps IV. C and D.

Steps I and II are specific to recognition of hand-written print while steps III and IV can be used for any pattern recognition. The block diagram for the apparatus for carrying out steps III and IV is shown in FIG. 1. The apparatus for carrying out steps I and II is conventional and known in the art. An alternative method of determining the line image of character image in step II is the following:

A. Get a two dimensional, spatial frequency spectrum or facsimile of the raw image. The highest frequency peak corresponds to the average stroke width. The second highest peak corresponds to the average character size. The third highest peak corresponds to the average line height.

B. Compute the kernel sizes required for line and character separation from the spatial frequency spectrum and table 1.

C. Convolve the binary image with a horizontal or near horizontal trilateral kernel to isolate character lines.

D. Convolve the binary image with a vertical or near vertical trilateral kernel to isolate individual characters.

The performance of the neural classifier can be divided into a number of properties that include discrimination ability, grouping ability, sensitivity and efficiency. The ability to discriminate similar character patterns from different classes in combination with the ability to group different character patterns from the same class defines the total recognition ability. These opposing abilities create a tension in the learning nature of the neural classifier. The best recognition performance comes from the most parsimonious balance between these opposing forces. This characteristic of a classification system is very well suited for this invention.

Figure 5:
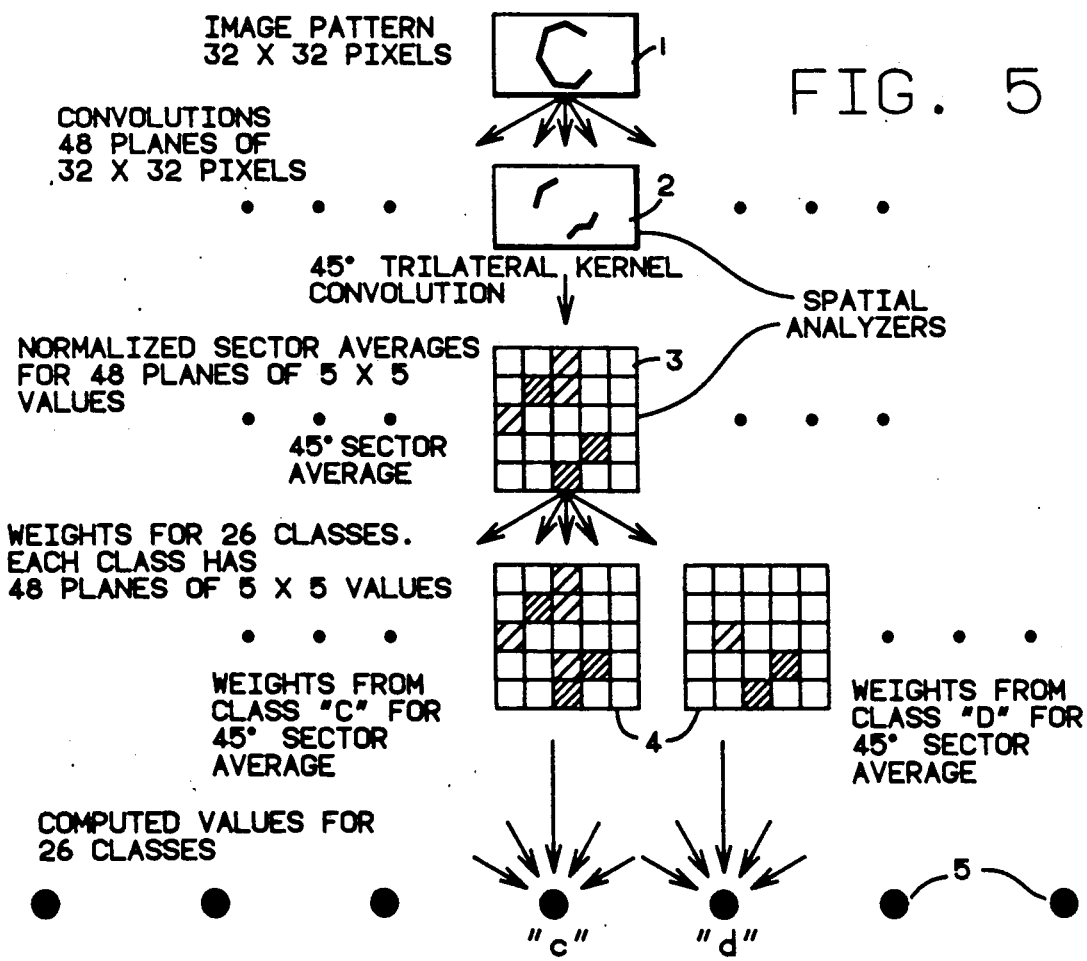
FIG. 5 is a block diagram of an example of classification.

FIG. 5 is a block diagram showing the steps of an example of classification of a pattern.

In step 1, an image pattern of the hand written letter "c" is portrayed and is defined by a 32×32 pixel binary image. The image is then convolved in spatial analyzers S1−Sk where k=48. In this instance, 48 different kernels as shown in FIG. 2a-2o are utilized, including a selection of three of the kernels shown in FIGS. 2a-2o each used in 16 different combinations of size and orientation. For example, in the specific convolution shown at step 2, a trilateral kernel 2 m was used at a 45° angle and in a size configured to be 1/5 the window size. It is noted that the image pattern shown in step 1 is included in the spatial window which is defined by the 32×32 pixels.

Each of the 48 planes is an image defined by 32×32 pixels and in order to reduce the amount of processing information, each of the planes are averaged and normalized in normalizers N1-Nk into a plane of 5×5 values in step 3. As shown in the specific example in step 3, a graphical representation is used to show relative values, where the darker squares represent higher values than the lighter squares and the white squares are 0 values. The example shown in FIG. 3 represents the 48 planes after they have been both normalized and averaged in averagers A1-Ak.

Assuming now that the number of classes equals 26, that is, one class for each letter of the alphabet, (and thus P=26), each of the 48 normalized sector averages from step 3 are multiplied by weight maps W1-Wk. There are weights for each of the 26 classes and thus each class has 48 planes of 5×5 values for multiplying with the 48 sector averages from step 3.

Thus in step 3 the 5×5 sector average from step 3 is multiplied by the weights for the class of letters a-z for the 45° sector average. This same multiplication is carried out for each of the other 47 planes.

Step 4 illustrates two 5×5 sectors which have the weights therein in a graphic representation, wherein the different shades represent relative magnitude.

In step 5 all of the multiplications produce computed values for the 26 classes. From these computer values, the one having the highest probability is selected as the classified pattern. Thus if the pattern for "c" has the highest probability, then the pattern is classified as the letter "c".

In the learning or teaching mode, the output from step 5 is subtracted from the expected value for the letter c and is then used to update all of the weights for the 26 classes as shown in step 4.

Although the preferred embodiment of the generalized neural classifier is for recognizing hand written and typed characters, this invention may also be used in:

1. Computation methods and systems that use topographically defined analysis of signal patterns to directly or indirectly associate with pattern classes.

2. Computation methods and systems that generate sets of spatial contextual elements in one or more dimensions from a pattern of signals which are then used directly or indirectly to associate with pattern classes.

3. Computation methods and systems that generate measures of signal-pattern contrast over one or more dimensions and which are then used directly or indirectly to associate with pattern classes.

4. Computation methods and systems that generate spatial convolutions with spatial kernels configured in one or more dimensions and which are then used directly or indirectly to associate with pattern classes.

It will be appreciated that the instant specification and claims are set forth by way of illustration and not limitation, and that various modifications and changes may be made without departing from the spirit and scope of the present invention.

What is claimed is:

1. A method of classifying a pattern into one of a plurality of pattern classes, comprising the steps of:
   converting the pattern to be classified into an image comprising at least one spatial distribution of intensity amplitudes relative to a spatial window on the pattern;
   convolving the image with a plurality of different convolution kernels;
   averaging convolutions of the image across spatial sectors within the spatial window;
   transforming the averaged convolutions of the image with a distribution of weights for each of the plurality of pattern classes into computed correlations for each of the plurality of pattern classes; and
   determining a single pattern class of the plurality of pattern classes from the computed correlations, whereby the pattern is classified in said single pattern class.

2. The method according to claim 1, wherein the spatial sectors are overlapping.

3. The method according to claim 1, further comprising normalizing averaged convolutions of the image before the step of transforming.

4. The method according to claim 1, wherein the step of convolving the image with the plurality of different convolution kernels comprises using kernels of different configurations in different sizes and orientations relative to the image.

5. The method according to claim 1, further comprising defining the distribution of weights for a given pattern class of the plurality of pattern classes by storing a map of initial neural weights, initially converging a given pattern known to be classified in the given pattern class into an image comprising a given spatial distribution of intensity amplitudes, transforming the given spatial distribution with the map of initial neural weights into computed correlations for each of the plurality of pattern classes, determining errors from the computed correlations and expected correlations and updating the stored map of initial neural weights depending upon the determined errors.

6. The method according to claim 4, further comprising defining he distribution of weights for a given pattern class of the plurality of pattern classes and for a given convolution kernel of the plurality of convolution kernels by storing a map of initial neural weights for the given convolution kernel, initially converting a given pattern known to be classified in the given pattern class with the given convolution kernel into an image comprising a given spatial distribution of intensity amplitudes, transforming the given spatial distribution with the map of initial neural weights into computed correlations for each of the plurality of pattern classes, determining errors from the computed correlations and expected correlations and updating the stored map of initial neural weights depending upon the determined errors.

7. The method according to claim 1, wherein the step of converting comprises converting the pattern to be classified into a binary image.

8. The method according to claim 1, wherein the step of converting comprises converting the pattern to be classified into a two dimensional image.

9. A method of classifying a pattern into one of a plurality of pattern classes, comprising the steps of:
  converting the pattern to be classified into an image comprising at least one spatial distribution of intensity amplitudes relative to a spatial window on the pattern by disposing a center of the spatial window at a horizontal center and at a vertical center of the pattern to be classified and totally enclosing the pattern to be classified in the spatial window;
  transforming the image with a distribution of weights for each of the plurality of pattern classes into computed correlations for each of the plurality of pattern classes; and
  determining a single pattern class of the plurality of pattern classes from the computed correlations, whereby the pattern is classified in said single pattern class.

10. The method according to claim 9, for use in character recognition, wherein the step of converting the pattern to be classified into the image comprises converting a page into a binary image, processing the binary image to determine a number of lines of characters thereon and isolating each character on each line.

11. The method according to claim 10, wherein the step of disposing the spatial window at the horizontal center and vertical center of the pattern comprises disposing the spatial window at the horizontal center of a given character of a given line and at a vertical center of an average height of all characters in the given line.

12. The method according to claim 1, wherein the step of determining comprising selecting the single pattern class with a highest probability from the computed correlations.

13. A system for classifying a pattern into one of a plurality of pattern classes, comprising:
  means for converting a pattern to be classified into an image comprising at least one spatial distribution of intensity amplitudes relative to a spatial window on the pattern;
  means for convolving the image with a plurality of different convolution kernels;
  means for averaging convolutions of the image across spatial sectors within the spatial window;
  means for transforming the averaged convolutions of the image with a distribution of weights for each of the plurality of pattern classes into computed correlations for each of the plurality of pattern classes; and
  means for determining a single pattern class of the plurality of pattern classes from the computed correlations, whereby the pattern is classified in said single pattern class.

14. The system according to claim 13, wherein the spatial sectors are overlapping.

15. The system according to claim 13, further comprising means for normalizing averaged convolutions of the image before transforming by the means for transforming.

16. The system according to claim 13, wherein the plurality of different convolution kernels comprises kernels of different configurations in different sizes and orientations relative to the image.

17. The system according to claim 13, further comprising means for defining the distribution of weights for a given pattern class of the plurality of pattern classes comprising means for storing a map of initial neural weights, means for initially converting a given pattern known to be classified in the given pattern class into a image comprising a given spatial distribution of intensity amplitudes, means for transforming the given spatial distribution with the map of initial neural weights into computed correlations for each of the plurality of pattern classes, means for determining errors from the computed correlations and expected correlations and means for updating the stored map of initial neural weights depending upon the determined errors.

18. The system according to claim 16, further comprising means for defining the distribution of weights for a given pattern class of the plurality of pattern classes and for a given convolution kernel of the plurality of convolution kernels comprising means for storing a map of initial neural weights for the given convolution kernel, means for initially converting a given pattern known to be classified in the given pattern class with the given convolution kernel into an image comprising a given spatial distribution of, intensity amplitudes, means for transforming the given spatial distribution with the map of initial neural weights into computed correlations for each of the plurality of pattern classes, means for determining errors from the computed correlations and expected correlations and means for updating the stored map of initial neural weights.

19. The system according to claim 13, wherein the means for converting comprises means for converting the pattern to be classified into a binary image.

20. The system according to claim 13, wherein the means for converting comprises means for converting the pattern to be classified into a two-dimensional image.

21. The system according to claim 13, wherein the means for determining comprises means for selecting the single pattern class with a highest probability from the computed correlations.

22. A system for classifying a pattern into one of a plurality of pattern classes, comprising:
  means for converting a pattern to be classified into an image comprising at least one spatial distribution of intensity amplitudes relative to a spatial window on the pattern, the means for converting comprising means for disposing a center of the spatial window at a horizontal center and at a vertical center of the pattern to be classified and for totally enclosing the pattern to be classified in the spatial window;
  means for transforming the image with a distribution of weights for each of the plurality of pattern classes into computed correlations for each of the plurality of pattern classes; and
  means for determining a single pattern class of the plurality of pattern classes from the computed correlations, whereby the pattern is classified in said single pattern class.

23. The system according to claim 22, for use in character recognition, wherein the means for converting the pattern to be classified into the image comprises means for converting a page into a binary image, means for processing the binary image to determine a number of lines of characters and means for isolating each character on each line.

24. The system according to claim 23, wherein the means disposing the spatial window at a horizontal and vertical center of the pattern comprises means disposing the spatial window at the horizontal center of a given character of a given line and at a vertical center of an average height of all characters in the given line.

* * * * *